US007605352B2

(12) United States Patent
Nagao et al.

(10) Patent No.: US 7,605,352 B2
(45) Date of Patent: Oct. 20, 2009

(54) METHOD FOR SORTING POSITIVE TEMPERATURE COEFFICIENT (PTC) ELEMENTS

(75) Inventors: Yoshitaka Nagao, Omihachiman (JP); Hiroshi Ibaragi, Higashiomi (JP); Yutaka Ikeda, Higashiomi (JP); Kazuto Miyagawa, Kusatsu (JP); Yoshiaki Abe, Higashiomi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 625 days.

(21) Appl. No.: 11/466,775

(22) Filed: Aug. 24, 2006

(65) Prior Publication Data

US 2006/0289478 A1 Dec. 28, 2006

Related U.S. Application Data

(63) Continuation of application No. PCT/JP2004/017233, filed on Nov. 19, 2004.

(30) Foreign Application Priority Data

Feb. 25, 2004 (JP) ............................. 2004-050153

(51) Int. Cl.
*H05B 3/10* (2006.01)
*H02H 5/04* (2006.01)

(52) U.S. Cl. ....................... 219/553; 219/552; 320/134; 320/136; 338/17; 338/20; 338/21; 338/320; 338/23; 338/48; 338/49; 338/22 R; 361/103; 361/106; 361/156; 361/155; 361/71; 361/91; 361/225 D

(58) Field of Classification Search ................. 219/553, 219/552; 320/134, 136; 338/17, 20–23, 338/320, 48–9, 22 R, 225 D; 361/103, 106, 361/154–6, 91, 71; 324/765
See application file for complete search history.

(56) References Cited

U.S. PATENT DOCUMENTS

| | | | | |
|---|---|---|---|---|
| 5,933,311 | A * | 8/1999 | Chen et al. | 361/106 |
| 2003/0090288 | A1 * | 5/2003 | Nakata et al. | 324/765 |

FOREIGN PATENT DOCUMENTS

| | | | |
|---|---|---|---|
| JP | 07-294568 | A | 11/1995 |
| JP | 09-092504 | A | 4/1997 |

OTHER PUBLICATIONS

International Search Report issued in corresponding International Application No. PCT/JP2004/017233, mailed on Mar. 1, 2005.

* cited by examiner

*Primary Examiner*—Shawntina Fuqua
(74) *Attorney, Agent, or Firm*—Keating & Bennett, LLP

(57) ABSTRACT

In a method for sorting PTC elements having different resistance-temperature characteristics, a predetermined voltage that allows a current to sufficiently decay is applied to each of PTC elements A and B, and the PTC elements are sorted on the basis of the difference between the times required for the currents passing through the PTC elements B to reach a predetermined value (e.g., 52 mA).

8 Claims, 9 Drawing Sheets

METHOD FOR SORTING POSITIVE TEMPERATURE COEFFICIENT (PTC) ELEMENTS

BACKGROUND OF THE INVENTION

1. Field of the Invention

The present invention relates to a method for sorting positive temperature coefficient (PTC) elements having different resistance-temperature characteristics.

2. Description of the Related Art

In general, PTC elements which have positive resistance-temperature characteristics have a characteristic in which the resistance value rapidly increases above the Curie temperature (hereinafter referred to also as CP as appropriate), and are used as, for example, over-current protective elements in electronic circuits or temperature sensing elements.

For these PTC elements, defects in the characteristics caused by, for example, admixture of impurities in a manufacturing process may occur. Therefore, the quality of produced PTC elements should be determined. One example of a method of performing such a determination of the quality is, for example, a method of measuring the impedance of a PTC element and evaluating the quality on the basis of the value of a resistance component (see, for example, Japanese Unexamined Patent Application Publication No. 7-294568 (Patent Document 1). Another example of the determining method is a method of setting the value of an inrush current and the value of a steady-state current during energization and selecting a PTC element having an inrush current and steady-state current that do not exceed a corresponding set value (see, for example, Japanese Unexamined Patent Application Publication No. 9-092504 (Patent Document 2).

Recently, to respond to market demands, PTC elements having various resistance-temperature characteristics are commercially available, and microminiaturization of PTC elements is advancing. Recently, microchip components having a size of, for example, 1.6×0.8 mm and 0.6×0.3 mm, have been developed.

In the course of component management of PTC elements, a PTC element having a different characteristic may be inadvertently mixed with managed PTC elements. In such a case, it is necessary to separate the mixed foreign component. However, it is difficult to separate a PTC element having a different resistance-temperature characteristic by using either of the known methods described above. Thus, an improvement to enhance efficiency in component management is desired.

In order to avoid a foreign component from being mixed, an approach to apply identification marking to PTC elements is available. However, when miniaturization of chips advances, marking a microchip component is difficult, and therefore, it is impossible to distinguish differences in resistance-temperature characteristics from outward appearances. Practically, characteristics cannot be determined by resistance value or resisting pressure that can be measured in a short time. As a result, in order to separate a mixed PTC element, it is necessary to perform a 100-percent inspection and measure the resistance-temperature characteristic of each of the PTC elements, such that a problem arises in which a large amount of time and effort is required.

SUMMARY OF THE INVENTION

To overcome the problems described above, preferred embodiments of the present invention provide a method for sorting PTC elements, the method being capable of sorting the PCT elements readily and reliably when a foreign component is mixed in the PTC elements.

According to a first preferred embodiment of the present invention, a method for sorting PCT elements includes the steps of applying a predetermined voltage that allows a current to sufficiently decay to each of the PTC elements and sorting the PTC elements on the basis of the difference between the times required for the currents passing through the PTC elements to reach a predetermined current value.

According to a second preferred embodiment of the present invention, a method for sorting PCT elements includes the steps of applying a predetermined voltage that allows a current to sufficiently decay to each of the PTC elements and sorting the PTC elements on the basis of the difference between the current values passing through the PTC elements when a predetermined time has elapsed.

According to a third preferred embodiment of the present invention, a method for sorting PCT elements includes the steps of applying a predetermined voltage that allows a current to sufficiently decay to each of the PTC elements and sorting the PTC elements on the basis of the differences between the times required for the currents passing through the PTC elements to reach a plurality of predetermined current values.

According to a fourth preferred embodiment of the present invention, a method for sorting PCT elements includes the steps of applying a predetermined voltage that allows a current to sufficiently decay to each of the PTC elements and sorting the PTC elements on the basis of the differences between the current values passing through the PTC elements when a plurality of predetermined times have elapsed.

According to a fifth preferred embodiment of the present invention, a method for sorting PCT elements includes the steps of applying a plurality of predetermined voltages that allow a current to sufficiently decay to each of the PTC elements and sorting the PTC elements on the basis of the differences between the times required for the currents passing through the PTC elements to reach a predetermined current value.

According to a sixth preferred embodiment of the present invention, a method for sorting PCT elements includes the steps of applying a plurality of predetermined voltages that allow a current to sufficiently decay to each of the PTC elements and sorting the PTC elements on the basis of the differences between the current values passing through the PTC elements when a predetermined time has elapsed.

According to a seventh preferred embodiment of the present invention, in the fourth preferred embodiment, at least two current values are measured in each of the PTC elements, the measured current values are accumulated to determine an accumulated value, and the PTC elements are sorted on the basis of the difference between the accumulated values.

According to an eighth preferred embodiment of the present invention, in the seventh preferred embodiment, a section to accumulate the current values is the section in which the currents range from about 20% of the value of an inrush current to about 80% thereof.

In the present invention, "a predetermined voltage that allows a current to sufficiently decay" means a voltage as described below. That is, it means a voltage that exceeds a point where a current that passes through the PCT element, the current gradually increasing with an increase in the voltage applied to the PTC element and decreasing after the current reaches a maximum value, is the maximum value.

In the first preferred embodiment of the present invention, a predetermined voltage that allows a current to sufficiently decay is applied to each of the PTC elements and the PTC elements are sorted on the basis of the difference between the times required for the currents passing through the PTC elements to reach a predetermined current value. In the second preferred embodiment of the present invention, a predetermined voltage that allows a current to sufficiently decay is applied to each of the PTC elements and the PTC elements are sorted on the basis of the difference between the current values passing through the PTC elements when a predetermined time has elapsed. Therefore, a mixed foreign component can be identified readily and reliably by using the difference between the dynamic characteristics of the PTC elements, and efficiency in component management is improved.

In other words, when the voltage is applied to the PTC elements, the resistance value thereof increases due to self-heating of the PTC elements, and the current passing through the PTC elements thus gradually decays. The shape of a decay curve varies depending on the characteristics (e.g., Curie temperature and resistance-temperature characteristics) of the PTC elements. Therefore, the PTC elements can be sorted by comparing the times required to reach a predetermined current after the application of the voltage begins or the current values when a predetermined time has elapsed.

In the third preferred embodiment of the present invention, a predetermined voltage that allows a current to sufficiently decay is applied to each of the PTC elements and the PTC elements are sorted on the basis of the differences between the times required for the currents passing through the PTC elements to reach a plurality of predetermined current values. In the fourth preferred embodiment of the present invention, a predetermined voltage that allows a current to sufficiently decay is applied to each of the PTC elements and the PTC elements are sorted on the basis of the differences between the current values passing through the PTC elements when a plurality of predetermined times have elapsed. Therefore, a mixed foreign component can be identified readily and reliably based on the difference between the dynamic characteristics of the PTC elements, and sort accuracy is improved.

In the fifth preferred embodiment of the present invention, a plurality of predetermined voltages that allow a current to sufficiently decay is applied to each of the PTC elements and the PTC elements are sorted on the basis of the differences between the times required for the currents passing through the PTC elements to reach a predetermined current value. In the sixth preferred embodiment of the present invention, a plurality of predetermined voltages that allow a current to sufficiently decay is applied to each of the PTC elements and the PTC elements are sorted on the basis of the differences between the current values passing through the PTC elements when a predetermined time elapses. Therefore, a mixed foreign component can be identified readily and reliably, and the sort accuracy is further improved.

In the seventh preferred embodiment of the present invention, at least two current values are measured in each of the PTC elements, the measured currents are accumulated to an accumulated value, and the PTC elements are sorted on the basis of the difference between the accumulated values. Therefore, a mixed foreign component can be identified readily and reliably by using the resistance-temperature characteristics and the values of Curie temperature of the PTC elements on the basis of the accumulated values, and the PTC elements can be sorted in a short period of time.

In the eighth preferred embodiment of the present invention, a section to accumulate the current values is the section in which the currents range from about 20% of the value of an inrush current to about 80% thereof. Therefore, a mixed foreign component can be separated more reliably with high accuracy.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention are described below with reference to the accompanying drawings.

Figure 1:
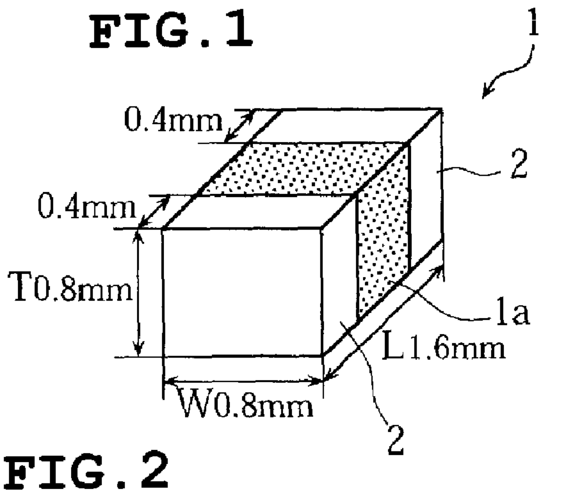
FIG. 1 is a perspective view of a PTC element according to a preferred embodiment of the present invention.
Figure 2:
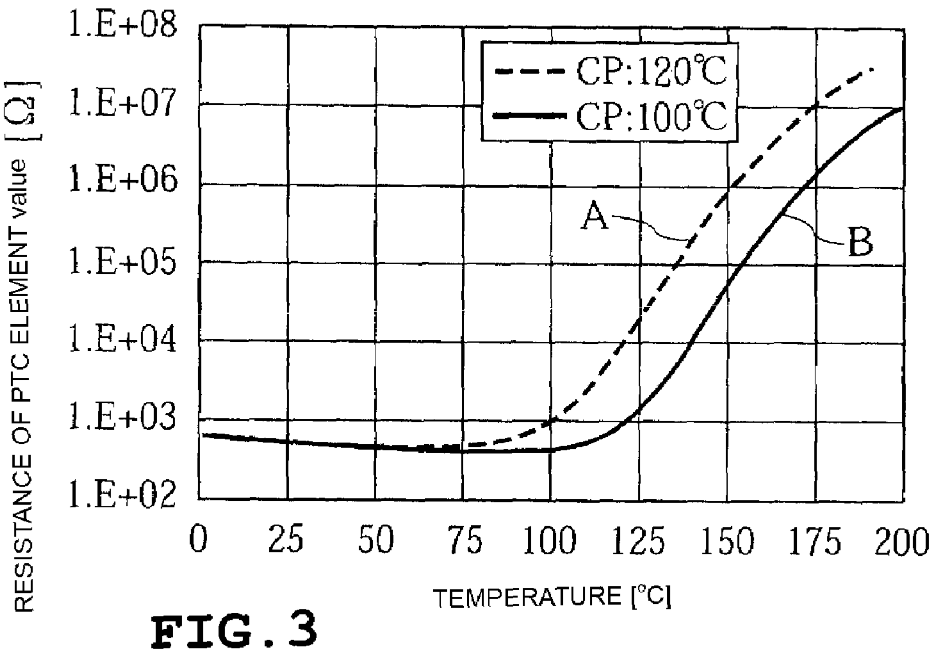
FIG. 2 illustrates resistance-temperature characteristics for PTC elements.
Figure 3:
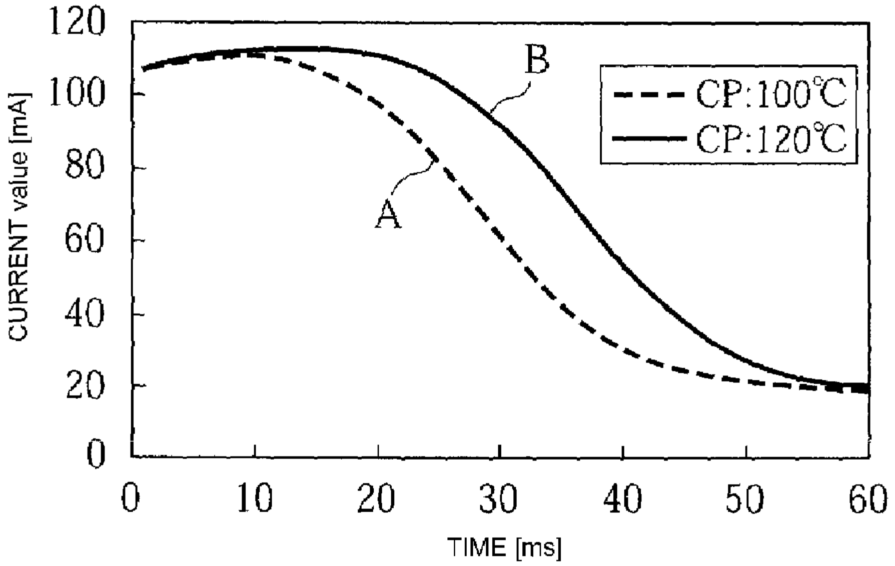
FIG. 3 illustrates dynamic characteristics for the PTC elements.
Figure 4:
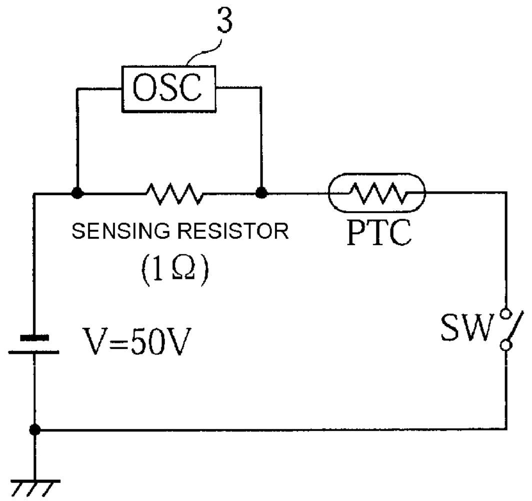
FIG. 4 is a measurement circuit diagram for the PTC elements.
Figure 5:
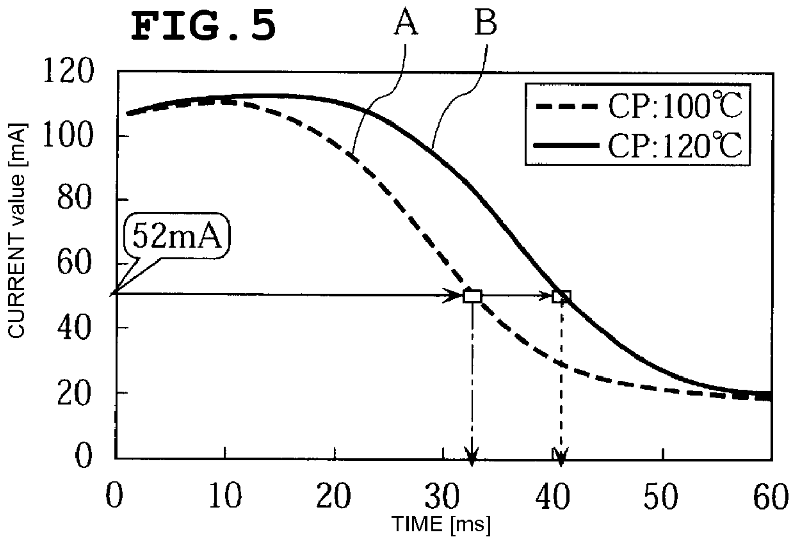
FIG. 5 is a characteristic diagram showing the relationship between the current value in the PTC elements and time.

FIGS. 1 to 5 are illustrations for explaining a method for sorting PTC elements according to a first preferred embodiment of the present invention. FIG. 1 is a perspective view of a PTC element. FIG. 2 is a diagram showing resistance-temperature characteristics of the PTC elements. FIG. 3 is a characteristic diagram showing the relationship between the current value being a dynamic characteristic for the PTC elements and time. FIG. 4 is a measurement circuit diagram for the PTC elements. FIG. 5 is a characteristic diagram showing the relationship between the current value in the PTC elements and time.

As illustrated in FIG. 1, a PTC element 1 according to this preferred embodiment includes internal electrodes (not shown) that are incorporated in a substantially rectangular parallelepiped semiconductor ceramic 1*a*, and the internal electrodes are connected to external electrodes 2 provided on the opposite ends of the semiconductor ceramic 1*a*. The PTC element 1 has an element size of, for example, about 1.6 mm (L)× about 0.8 mm (W)× about 0.8 mm (T), and the width of each of the external electrodes is about 0.4 mm.

The sorting of two types of PTC elements having different resistance-temperature characteristics is performed by the application of a predetermined voltage that allows a current to sufficiently decay to the PTC elements and the sorting on the basis of the difference between the times required for the currents passing through the PTC elements to decrease to a predetermined current value.

As a concrete example, illustrated in FIGS. 2 and 3, the sorting of PTC elements A (refer to dashed lines) of CP=100±5° C. and PTC elements B (refer to solid lines) of CP=120±5° C. with R25=470Ω±50% is described below. The term R25 indicates the resistance value at 25° C.

As illustrated in the measurement circuit of FIG. 4, the PTC elements A and B were subjected to the application of a DC voltage of 50 V, and the waveforms of currents passing through the PTC elements A and B during the application were measured with an oscilloscope 3. As illustrated in FIG. 5, the time from when the application of the voltage began to when a current of 52 mA passed through each of the PTC elements A and B was measured. As a consequence, the times required to reach 52 mA for the PTC elements A ranged from about 31 ms to about 33 ms, and those for the PTC elements B ranged from about 39 ms to about 42 ms.

EXAMPLE 1

In this example, 10,000 PTC elements A were prepared, 5 PTC elements B were mixed with these PTC elements A, and the PTC elements A and B were sorted.

The PTC elements A and B were subjected to the application of a DC voltage of 50 V, the times required for a current of 52 mA to pass through the PTC elements A and B were measured, and elements deviating from a standard of about 31 ms to about 33 ms were separated.

As a result, five elements that deviated from the standard were present. As shown in Table 1, all of the elements having sample Nos. 1 to 5 were the PTC elements B whose CP was 120±5° C.

According to example 1, since a voltage that allows a current to sufficiently decay is applied to the PTC elements A and B, and the PTC elements A and B are sorted on the basis of the difference between the times required for the currents to reach a predetermined current value, one or more mixed foreign components can be identified readily and reliably in as little as several tens of milliseconds per component by using the difference between the dynamic characteristics of the PTC elements A and B, and efficiency in component management is improved.

TABLE 1

| Sample No. | Time[ms] | CP[° C.] |
|---|---|---|
| 1 | 41.6 | 123 |
| 2 | 41.2 | 121 |
| 3 | 41.0 | 120 |
| 4 | 40.7 | 119 |
| 5 | 40.1 | 117 |

In the above preferred embodiment, a mixed foreign PTC element is separated. However, a sorting method according to preferred embodiments of the present invention is also applicable to the determination of the quality of PTC elements by using the method described above.

Figure 6:
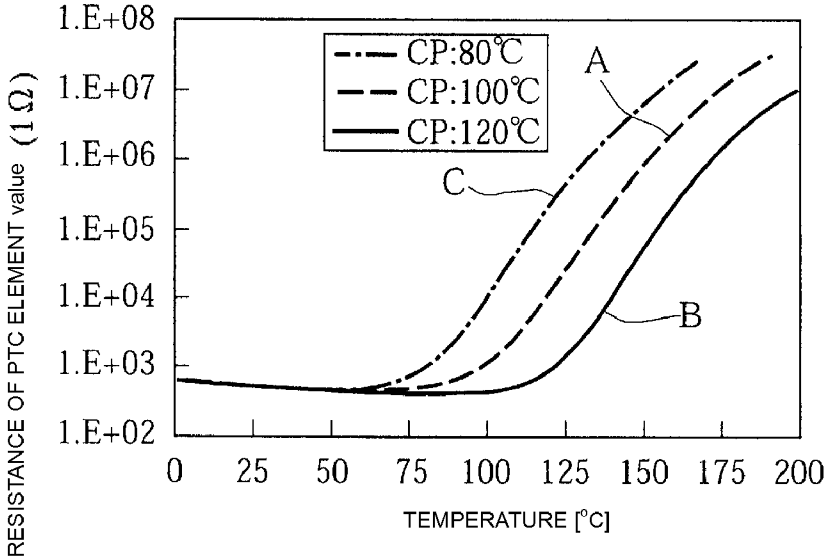
FIG. 6 illustrates resistance-temperature characteristics for PTC elements.
Figure 7:
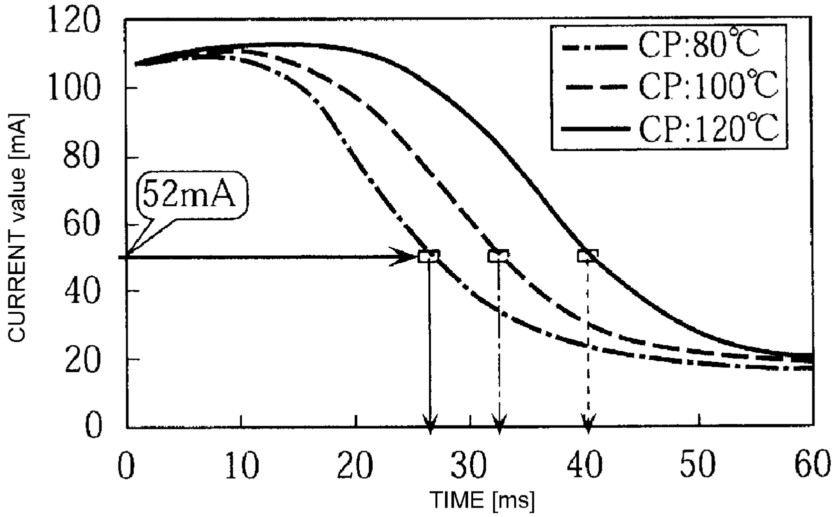
FIG. 7 is a characteristic diagram showing the relationship between the current value in the PTC elements and time.

FIGS. 6 and 7 are illustrations for explaining a second preferred embodiment of the present invention. FIG. 6 is a characteristic diagram of resistance-temperature characteristics for the PTC elements. FIG. 7 is a characteristic diagram showing the relationships between the current value in the PTC elements and time.

In this preferred embodiment, in addition to the PTC elements A and B, PTC elements C of CP=80±5° C. were mixed, and three types of PTC elements A, B, and C having different resistance-temperature characteristics were sorted.

The PTC elements A to C were subjected to the application of a DC voltage of 50 V, and the waveforms of currents passing through the PTC elements A to C during the application were measured with the oscilloscope. As illustrated in FIG. 7, the time required for a current of 52 mA to pass through each of the PTC elements A to C after the beginning of the application of the voltage was measured. As a result, the times required to reach 52 mA for the PTC elements A ranged from about 31 ms to about 33 ms, those for the PTC elements B ranged from about 39 ms to about 42 ms, and those for the PTC elements C ranged from about 25 ms to about 27 ms.

EXAMPLE 2

In example 2, 10,000 PTC elements A were prepared, 5 PTC elements B and 5 PTC elements C were mixed with these PTC elements A, and the PTC elements A to C were sorted.

The PTC elements A to C were subjected to the application of a DC voltage of 50 V, the time required for a current of 52 mA to pass through each of the PTC elements A to C was measured, and elements deviating from a standard of about 31 ms to about 33 ms were separated.

As a result, ten elements deviating from the standard of about 31 ms to about 33 ms were present. As shown in Table 2, the elements having sample Nos. 11 to 20 were either of the PTC elements B whose CP was 120±5° C. and the PTC elements C whose CP was 80±5° C. According to example 2, one or more mixed foreign components can be identified readily and reliably in as little as several tens of milliseconds per component, and an advantageous effect similar to that in the above example is obtained.

TABLE 2

| Sample No. | Time[ms] | CP[° C.] |
|---|---|---|
| 11 | 41.6 | 123 |
| 12 | 41.2 | 121 |
| 13 | 41.0 | 120 |
| 14 | 40.7 | 119 |
| 15 | 40.1 | 117 |
| 16 | 27.0 | 85 |
| 17 | 26.6 | 83 |
| 18 | 25.5 | 77.5 |
| 19 | 25.3 | 76.5 |
| 20 | 25.0 | 75 |

Figure 8:
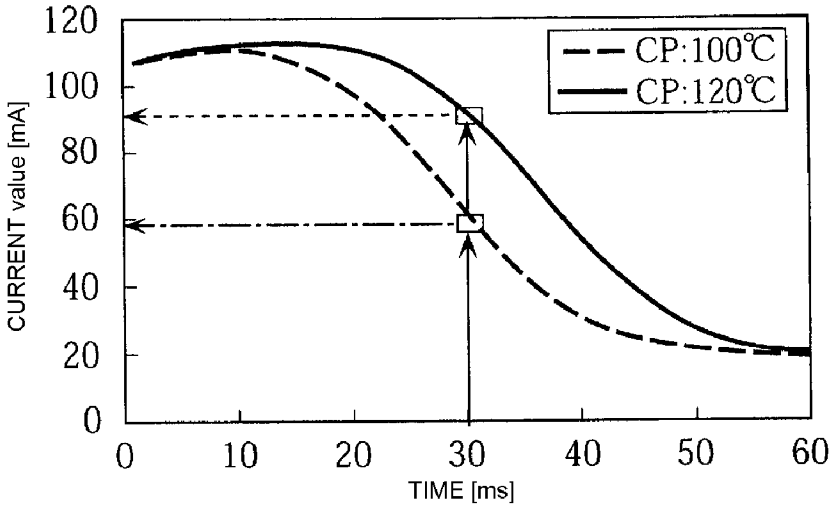
FIG. 8 is a characteristic diagram showing the relationship between the current value in the PTC elements and time.

FIG. 8 is a characteristic diagram showing the relationship between the current value in the PTC elements and time for explaining a sorting method according to a third preferred embodiment of the present invention.

In this preferred embodiment, the PTC elements A and B were subjected to the application of a DC voltage of 50 V, and the waveforms of currents passing through the PTC elements A and B during the application were measured with the oscilloscope, as in the foregoing preferred embodiments. The current values passing through the PTC elements A and B were measured when 30 ms elapsed from the beginning of the application of the voltage. As a consequence, the current values at 30 ms for the PTC elements A ranged from about 58 mA to about 62 mA, and those for the PTC elements B ranged from about 87A to about 93A.

EXAMPLE 3

In example 3, 10,000 PTC elements A were prepared, 5 PTC elements B were mixed with these PTC elements A, and the PTC elements A and B were sorted.

The PTC elements A and B were subjected to the application of a DC voltage of 50 V, the current values passing through the PTC elements A and B were measured when 30 ms elapsed from the beginning of the application of the voltage, and elements having their current values deviating from the range of about 58 to about 62 mA were separated.

Five elements deviating from the current range were present. As can be seen from Table 3, the elements having sample Nos. 21 to 25 were the PTC elements B whose CP was 120±5° C. According to example 3, one or more mixed foreign components can be identified readily and reliably in as little as several tens of milliseconds per component, and an advantageous effect similar to that in the above examples is obtained.

TABLE 3

| Sample No. | Current value[ms] | CP[° C.] |
|---|---|---|
| 21 | 92.0 | 123 |
| 22 | 91.5 | 121 |
| 23 | 91.0 | 120 |
| 24 | 90.0 | 119 |
| 25 | 89.0 | 117 |

EXAMPLE 4

In example 4, 10,000 PTC elements A were prepared, 5 PTC elements B and 5 PTC elements C were mixed with these PTC elements A, and the PTC elements A to C of three types were sorted.

Figure 9:
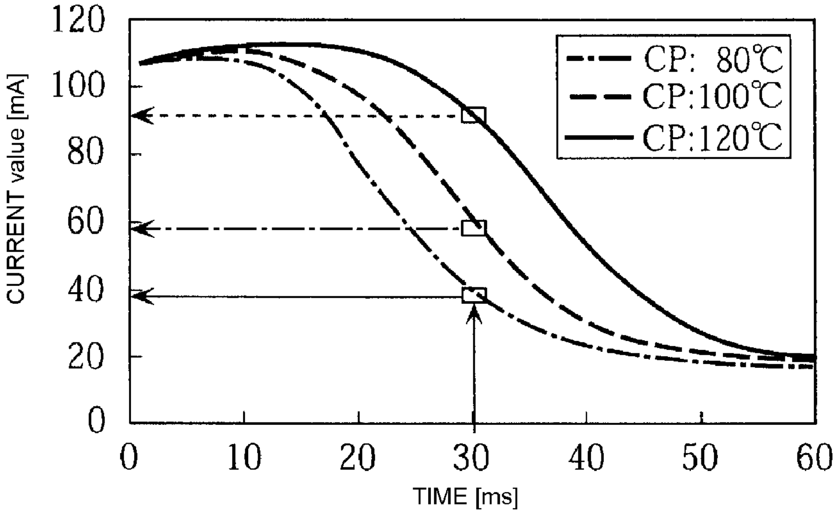
FIG. 9 is a characteristic diagram showing the relationship between the current value in the PTC elements and time.

As illustrated in FIG. 9, the PTC elements A to C were subjected to the application of a DC voltage of 50 V, the current values passing through the PTC elements A to C were measured when 30 ms elapsed from the beginning of the application of the voltage, and elements having their current values deviating from a standard of about 58 mA to about 62 mA were separated.

Ten elements deviating from the standard were present. As shown in Table 4, the elements having sample Nos. 31 to 40 were either of the PTC elements B whose CP was 120±5° C. and the PTC elements C whose CP was 80±5° C. According to example 4, one or more mixed foreign components can be identified readily and reliably in as little as several tens of milliseconds per component, and an advantageous effect similar to that in the above examples is obtained.

TABLE 4

| Sample No. | Current value[ms] | CP[° C.] |
|---|---|---|
| 31 | 92.0 | 123 |
| 32 | 81.5 | 121 |
| 33 | 91.0 | 120 |
| 34 | 90.0 | 119 |
| 35 | 89.0 | 117 |
| 36 | 40.0 | 85 |
| 37 | 39.0 | 82 |
| 38 | 38.0 | 80 |
| 39 | 37.0 | 78 |
| 40 | 36.0 | 75 |

EXAMPLE 5

Figure 10:
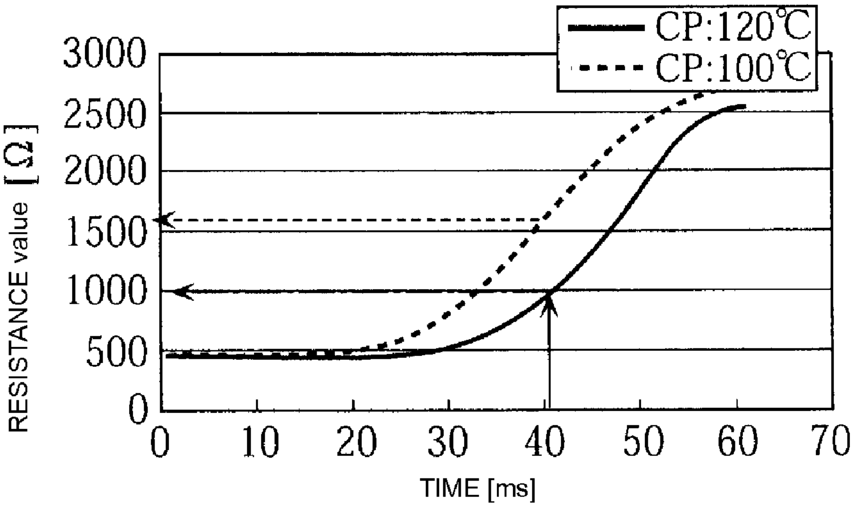
FIG. 10 is a characteristic diagram showing the relationship between the resistance value in the PTC elements and time.

In example 5, 10,000 PTC elements A were prepared, and 5 PTC elements B were mixed with these PTC elements A. As illustrated in FIG. 10, the PTC elements A and B were subjected to the application of a DC voltage of 50 V, the resistance value of each of the PTC elements A and B was measured when 40 ms elapsed from the beginning of the application of the voltage by being converted from a corresponding current value, and elements having their resistance value deviating from a standard of about 1620Ω to about 1670Ω were separated.

As a result, five elements deviating from the standard of about 1620Ω to about 1670Ω were present. As shown in Table 5, elements having sample Nos. 41 to 45 were the PTC elements B whose CP was 120±5° C. According to example 5, an advantageous effect similar to that in the above examples is obtained.

TABLE 5

| Sample No. | Resistance [Ω] | CP[° C.] |
|---|---|---|
| 41 | 965 | 123 |
| 42 | 953 | 121 |
| 43 | 950 | 120 |
| 44 | 944 | 119 |
| 45 | 936 | 117 |

EXAMPLE 6

Figure 11:
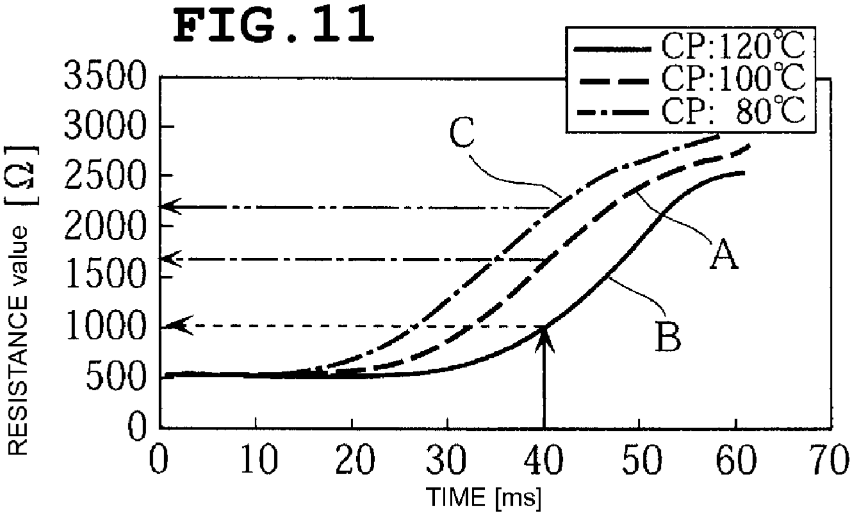
FIG. 11 is a characteristic diagram showing the relationship between the resistance value in the PTC elements and time.

In example 6, 10,000 PTC elements A were prepared, and 5 PTC elements B and 5 PTC elements C were mixed with these PTC elements A. As illustrated in FIG. 11, the PTC elements A to C were subjected to the application of a DC voltage of 50 V, the resistance value of each of the PTC elements A to C was measured when 40 ms elapsed from the beginning of the application of the voltage by being converted from a corresponding current value, and elements having their resistance value deviating from a standard of about 1620Ω to about 1670Ω were separated.

As a result, ten elements deviating from the standard of about 1620Ω to about 1670Ω were present. As can be seen from Table 6, the elements having sample Nos. 51 to 60 were either of the PTC elements B whose CP was 120±5° C. and the PTC elements C whose CP was 80±5° C. According to example 6, an advantageous effect similar to that in the above examples is obtained.

TABLE 6

| Sample No. | Resistance [Ω] | CP [° C.] |
|---|---|---|
| 51 | 965 | 123 |
| 52 | 953 | 121 |
| 53 | 950 | 120 |
| 54 | 944 | 119 |
| 55 | 936 | 117 |
| 56 | 2300 | 85 |
| 57 | 2230 | 83 |
| 58 | 2200 | 80 |
| 59 | 2180 | 78 |
| 60 | 2100 | 75 |

Figure 12:
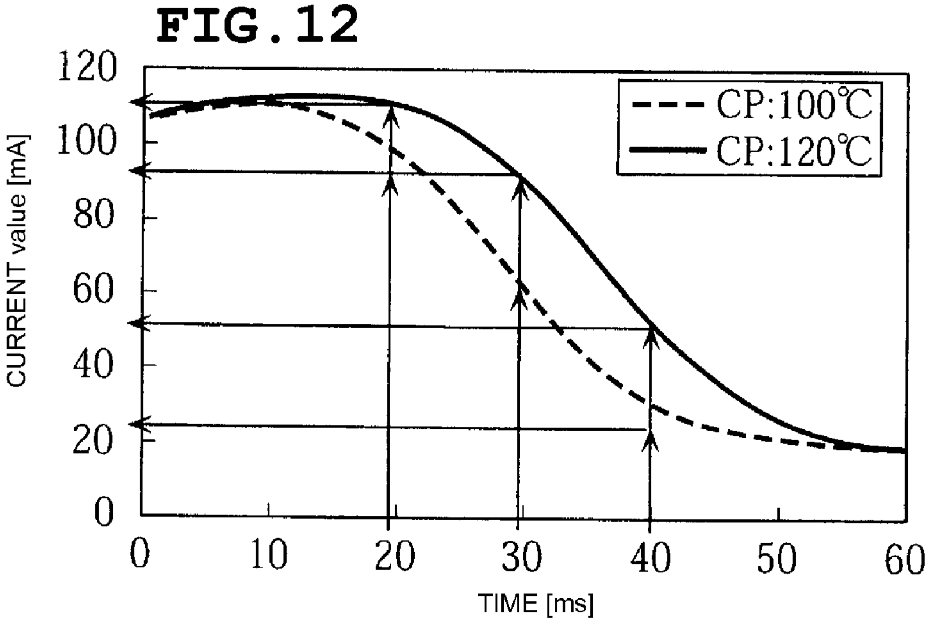
FIG. 12 is a characteristic diagram showing the relationship between the current value in the PTC elements and time.

FIG. 12 is a characteristic diagram showing the relationship between the current value in the PTC elements and time for explaining a sorting method according to a fourth preferred embodiment of the present invention.

In this preferred embodiment, the PTC elements A and B were subjected to the application of a DC voltage of 50 V, and the waveforms of currents passing through the PTC elements A and B during the application were measured with the oscilloscope. The current values passing through the PTC elements A and B were measured when 20 ms, 30 ms, and 40 ms elapsed from the beginning of the application of the voltage, respectively. As a consequence, the currents at 20 ms, 30 ms, and 40 ms for the PTC elements A ranged from about 93 mA to about 97 mA, about 58 mA to about 62 mA, and about 31 mA to about 33 mA, respectively, and those for the PTC elements B ranged from about 108 mA to about 112 mA, about 87 mA to about 93 mA, and about 51 mA to about 53 mA, respectively.

EXAMPLE 7

In example 7, 10,000 PTC elements A were prepared, 5 PTC elements B were mixed with these PTC elements A, and the PTC elements A and B were sorted.

The PTC elements A and B were subjected to the application of a DC voltage of 50 V, the currents passing through the PTC elements A and B were measured when 20 ms, 30 ms, and 40 ms elapsed from the beginning of the application of the voltage, respectively, and elements having their respective measured current values deviating from a standard of about 93 mA to about 97 mA, about 58 mA to about 62 mA, and about 31 mA to about 33 mA were separated.

As a result, five elements deviating from the current range were present. As shown in Table 7, the elements having sample Nos. 61 to 65 were the PTC elements B whose CP was 120±5° C. According to example 7, one or more mixed foreign components can be identified readily and reliably in as little as several tens of milliseconds per component, and an advantageous effect similar to that in the above examples is obtained.

TABLE 7

| Sample No. | After 20 ms Current value[mA] | After 30 ms Current value[mA] | After 40 ms Current value[mA] | CP[° C.] |
|---|---|---|---|---|
| 61 | 111.0 | 92.0 | 52.4 | 123 |
| 62 | 110.5 | 91.5 | 52.1 | 121 |
| 63 | 110.0 | 91.0 | 52.0 | 120 |
| 64 | 109.6 | 90.0 | 51.8 | 119 |
| 65 | 108.7 | 89.0 | 51.5 | 117 |

Figure 13:
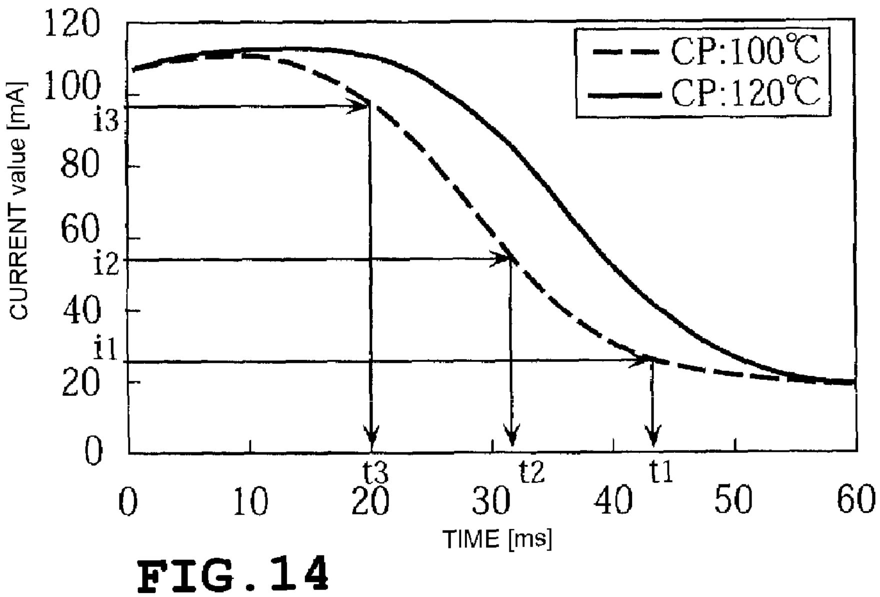
FIG. 13 is a characteristic diagram showing the relationship between the current value in the PTC elements and time.

In the above preferred embodiment, the PTC elements are sorted by reading the current value passing through the PTC elements A and B when 20 ms, 30 ms, and 40 ms elapse. However, as illustrated in FIG. 13, the PTC elements can be sorted on the basis of the difference in times t3, t2, and t1 for the currents passing through the PTC elements to reach a plurality of current values i1, i2, and i3, respectively. In this case, an advantageous effect similar to that in the above embodiments is also obtained.

EXAMPLE 8

Figure 14:
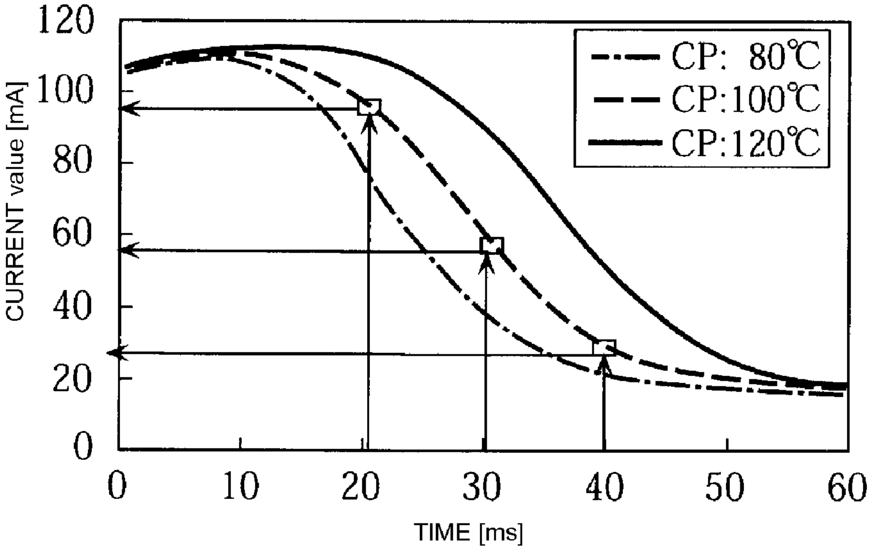
FIG. 14 is a characteristic diagram showing the relationship between the current value in the PTC elements and time.

In example 8, 10,000 PTC elements A were prepared, 5 PTC elements B and 5 PTC elements C were mixed with these PTC elements A, and the PTC elements A to C were sorted. As illustrated in FIG. 14, the PTC elements A to C were subjected to the application of a DC voltage of 50 V, the currents passing through the PTC elements A to C were measured when 20 ms, 30 ms, and 40 ms elapsed from the beginning of the application of the voltage, respectively, and elements having their respective measured current values deviating from a standard of about 93 mA to about 97 mA, about 58 mA to about 62 mA, and about 31 mA to about 33 mA were separated.

As a result, ten elements deviating from the current range were present. As can be seen from Table 8, the elements having sample Nos. 71 to 80 were either of the PTC elements B whose CP was 120±5° C. and the PTC elements C whose CP was 80±5° C. According to example 8, an advantageous effect similar to that in the above examples is obtained.

TABLE 8

| Sample No. | After 20 ms Current value[mA] | After 30 ms Current value[mA] | After 40 ms Current value[mA] | CP[° C.] |
|---|---|---|---|---|
| 71 | 111.0 | 92.0 | 52.4 | 123 |
| 72 | 110.5 | 91.5 | 52.1 | 121 |
| 73 | 110.0 | 91.0 | 52.0 | 120 |
| 74 | 109.6 | 90.0 | 51.8 | 119 |
| 75 | 108.7 | 89.0 | 51.5 | 117 |
| 76 | 81.0 | 40.0 | 25.0 | 85 |
| 77 | 80.5 | 39.5 | 24.2 | 83 |
| 78 | 79.5 | 39.0 | 23.5 | 80 |
| 79 | 78.8 | 38.6 | 22.6 | 78 |
| 80 | 78.0 | 38.0 | 22.0 | 75 |

Figure 15:
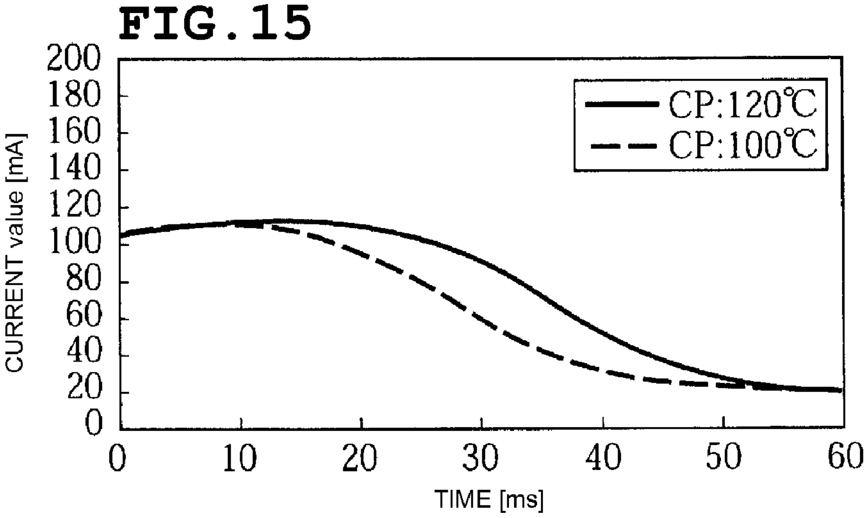
FIG. 15 is a characteristic diagram showing the decay curves for the PTC elements when a voltage of 50 V is applied.
Figure 16:
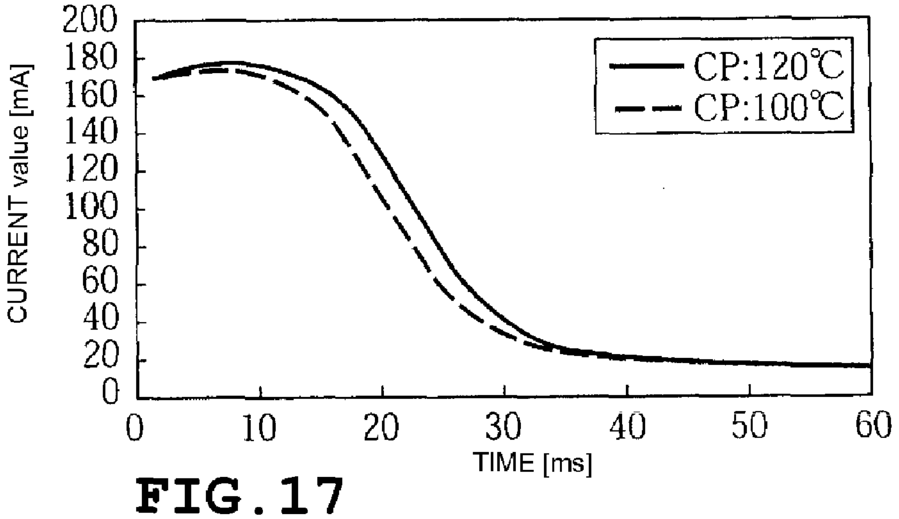
FIG. 16 is a characteristic diagram showing the decay curves for the PTC elements when a voltage of 80 V is applied.
Figure 17:
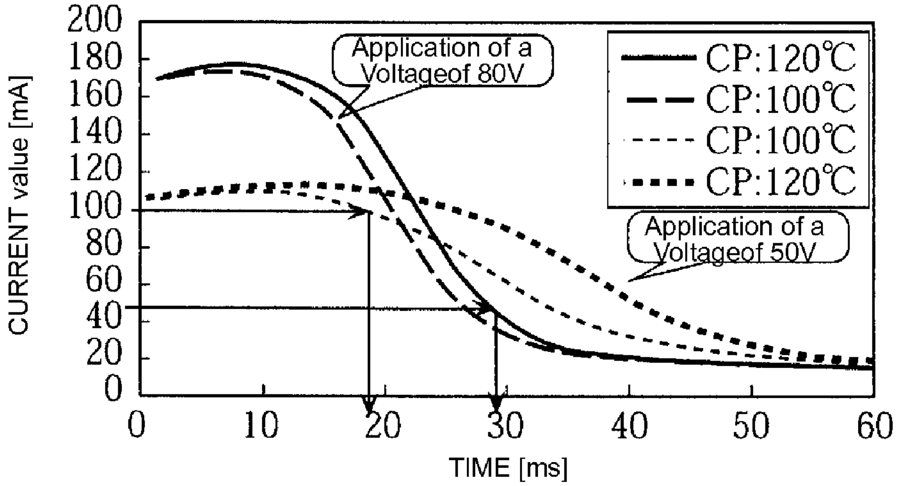
FIG. 17 is a characteristic diagram showing the relationship between the current value in the PTC elements and time.
Figure 18:
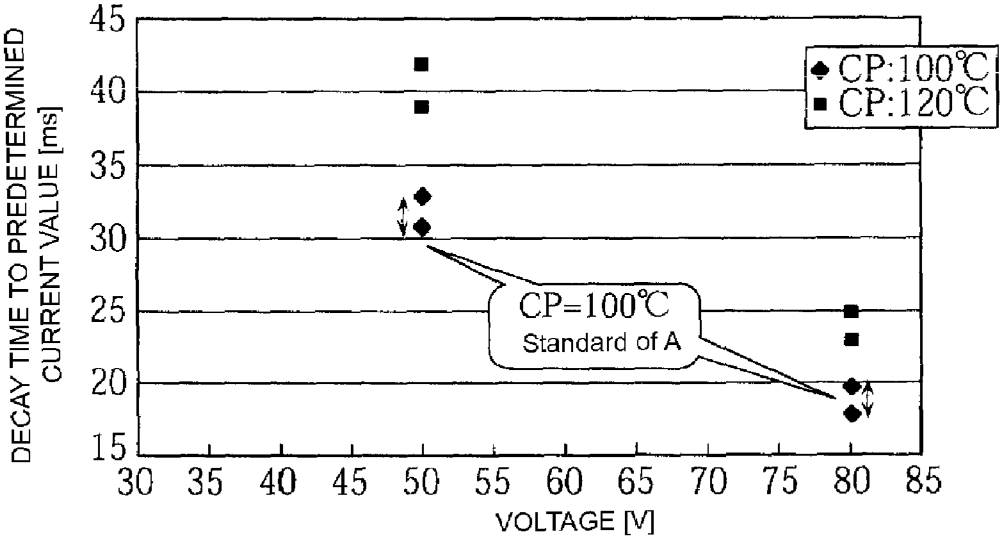
FIG. 18 illustrates the decay time required for the current to reach the predetermined current values.

FIGS. 15 to 18 are illustrations for explaining a sorting method according to a fifth preferred embodiment of the present invention. FIG. 15 is a characteristic diagram illustrating the decay curves of current passing through the PTC elements when a voltage of 50 V is applied. FIG. 16 is a characteristic diagram illustrating the decay curves of current passing through the PTC elements when a voltage of 80 V is applied. FIG. 17 is a characteristic diagram showing the relationship between the current value in the PTC elements and time when voltages of 50 V and 80 V are applied. FIG. 18 illustrates the relationship between the decay time for the PTC elements and the voltage.

In this preferred embodiment, the PTC elements A and B were subjected to the applications of DC voltages of 50 V and 80 V, and the waveforms of currents passing through the FTC elements A and B during the applications were measured with the oscilloscope. In the case of 50 V, the time required for a current of 60 mA to pass through each of the PTC elements A and B after the beginning of the application of the voltage was measured. In the case of 80 V, the time required for a current of 105 mA to pass through each of the PTC elements A and B after the beginning of the application of the voltage was measured. As a consequence, the times for the PTC elements A ranged from 31 ms to 33 ms in the case of 50 V and ranged from 18 ms to 20 ms in the case of 80 V, and those for the PTC elements B ranged from 39 ms to 42 ms in the case of 50 V and ranged from 23 ms to 25 ms in the case of 80 V.

EXAMPLE 9

In example 9, 10,000 PTC elements A were prepared, 5 PTC elements B were mixed with these PTC elements A, and the PTC elements A and B were sorted. The PTC elements A and B were subjected to the application of a DC voltage of 50 V, the times required for a current of 60 mA to pass through the PTC elements A and B were measured. After the PTC elements A and B were cooled to room temperature, the PTC elements A and B were again subjected to the application of a DC voltage of 80V, and the times required for a current of 105 mA to pass through the PTC elements A and B were measured. Elements deviating from the range of 31 ms to 33 ms in the case of 50 V and elements deviating from the range of 18 ms to 20 ms in the case of 80 V were separated.

As a consequence, five elements deviating from the ranges were present. As can be seen from Table 9, the elements having sample Nos. 81 to 85 were the PTC elements B whose CP was 120±5° C. According to example 9, an advantageous effect similar to that in the above examples can also be obtained.

TABLE 9

| Sample No. | Voltage 50 V Time[ms] | Voltage 80 V Time[ms] | CP[° C.] |
|---|---|---|---|
| 81 | 41.6 | 24.5 | 123 |
| 82 | 41.2 | 24.2 | 121 |
| 83 | 41.0 | 24.0 | 120 |
| 84 | 40.7 | 23.9 | 119 |
| 85 | 40.1 | 23.5 | 117 |

EXAMPLE 10

Figure 19:
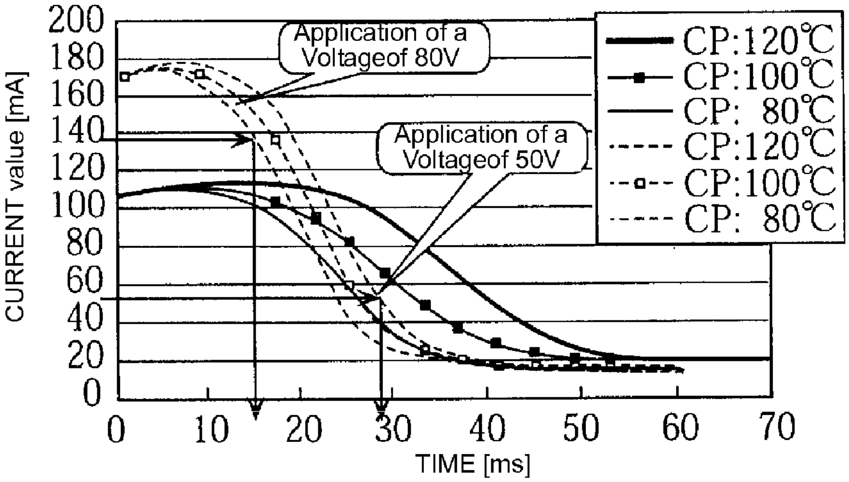
FIG. 19 is a characteristic diagram showing the relationship between the current value in the PTC elements and time.
Figure 20:
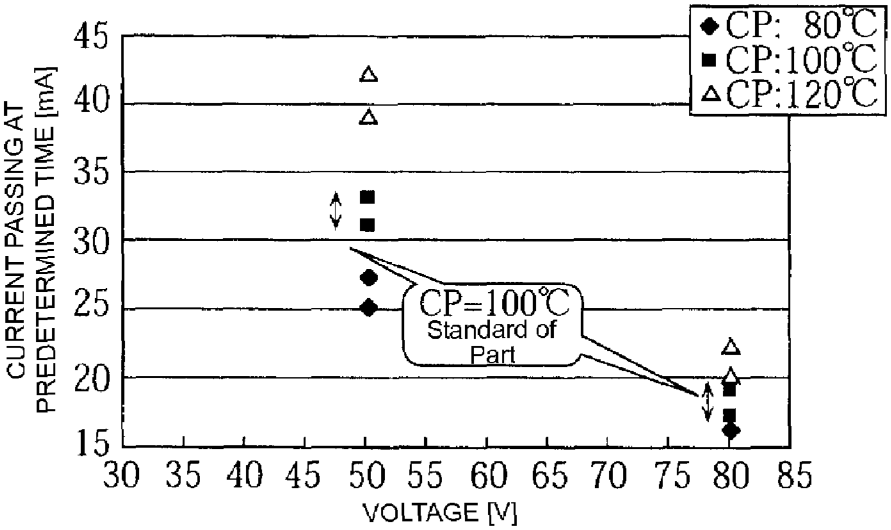
FIG. 20 illustrates the decay time required for the currents to reach the predetermined current values.

In example 10, 10,000 PTC elements A were prepared, 5 PTC elements B and 5 PTC elements C were mixed with these PTC elements A, and the PTC elements A to C were sorted. As illustrated in FIGS. 19 and 20, the PTC elements A to C were subjected to the application of a DC voltage of 50 V, the times required for a current of 60 mA to pass through the PTC elements A and C were measured. After the PTC elements A to C were cooled to room temperature, the PTC elements A to C were again subjected to the application of a DC voltage of 80V, and the times required for a current of 139 mA to pass through the PTC elements A to C were measured. Elements deviating from the range of about 31 ms to about 33 ms in the case of 50 V and elements deviating from the range of 17 ms to 19 ms in the case of 80 V were separated.

As a result, ten elements deviating from the ranges were present. As shown in Table 10, the elements having sample Nos. 91 to 100 were either of the PTC elements B whose CP was 120±5° C. and the PTC elements C whose CP was 80±5° C. According to example 10, an advantageous effect similar to that in the above examples is obtained.

TABLE 10

| Sample No. | Voltage 50 V Time[ms] | Voltage 80 V Time[ms] | CP[° C.] |
|---|---|---|---|
| 91 | 41.6 | 21.6 | 123 |
| 92 | 41.2 | 21.2 | 121 |
| 93 | 41.0 | 21.0 | 120 |
| 94 | 40.7 | 20.8 | 119 |
| 95 | 40.1 | 20.4 | 117 |
| 96 | 27.0 | 16.0 | 85 |
| 97 | 26.6 | 15.7 | 83 |
| 98 | 26.0 | 15.0 | 80 |
| 99 | 25.6 | 14.7 | 78 |
| 100 | 25.0 | 14.0 | 75 |

Figure 21:
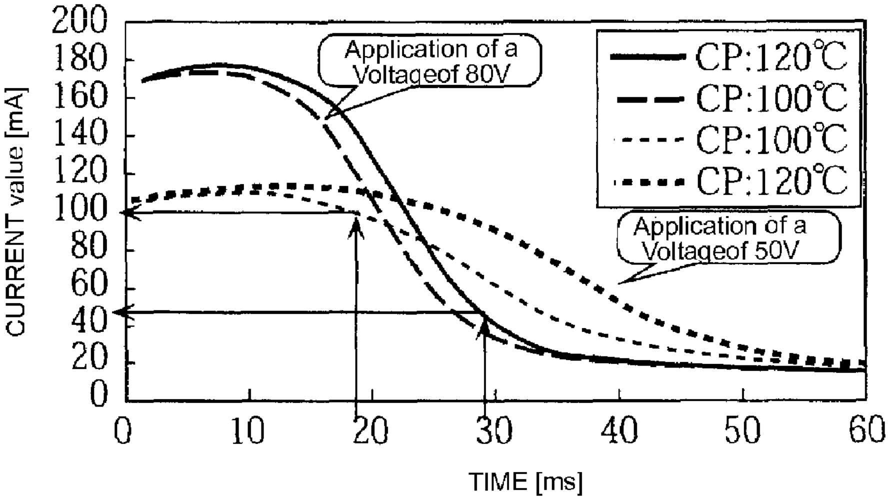
FIG. 21 is a characteristic diagram showing the relationship between the current value in the PTC elements and time.
Figure 22:
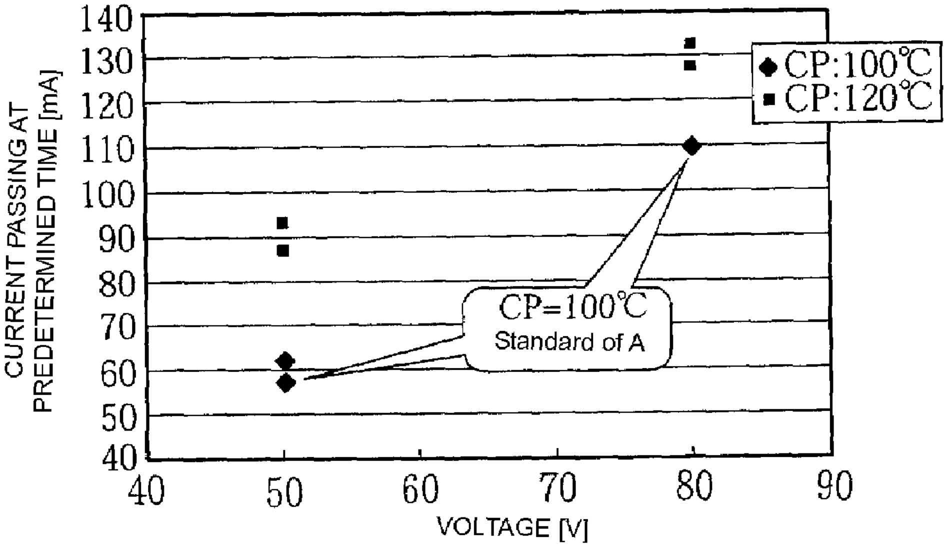
FIG. 22 illustrates the current passing at predetermined value times.

FIGS. 21 and 22 are illustrations for explaining a sorting method according to a sixth preferred embodiment of the present invention. FIG. 21 is a characteristic diagram showing the relationship between the current value in the PTC elements and time when voltages of 50 V and 80 V are applied. FIG. 22 illustrates the relationship between the current passing through the PTC elements and the applied voltage.

In this preferred embodiment, the PTC elements A and B were subjected to the applications of DC voltages of 50 V and 80 V, and the waveforms of currents passing through the PTC elements A and B during the applications were measured with the oscilloscope. In the case of 50 V, the current values passing through the PTC elements A and B were measured when 30 ms elapsed. In the case of 80V, the current values passing through the PTC elements A and B were measured when 20 ms elapsed. As a consequence, the current values for the PTC elements A ranged from about 58 mA to about 62 mA in the case of 50 V and ranged from about 108 mA to about 110 mA in the case of 80 V, and those for the PTC elements B ranged from about 87 mA to about 93 mA in the case of 50 V and ranged from about 128 mA to about 132 mA in the case of 80 V.

EXAMPLE 11

In example 11, 10,000 PTC elements A were prepared, 5 PTC elements B were mixed with these PTC elements A, and the PTC elements A and B were sorted. As illustrated in FIGS. 21 and 22, the PTC elements A and B were subjected to the application of a DC voltage of 50 V, the currents passing through the PTC elements A and B were measured when 30 ms elapsed. After the PTC elements A and B were cooled to room temperature, the PTC elements A and B were again subjected to the application of a DC voltage of 80V, and the currents passing through the PTC elements A and B were measured when 20 ms elapsed. Elements whose measured currents deviated from the range of about 58 mA to about 62 mA in the case of 50 V and elements whose measured currents deviated from the range of about 108 mA to about 110 mA in the case of 80 V were separated.

As a result, five elements deviating from the ranges were present. As can be seen from Table 11, the elements having sample Nos. 101 to 105 were the PTC elements B whose CP was 120±5° C. As described above, according to example 11, an advantageous effect similar to that in the above examples is obtained.

TABLE 11

| Sample No. | Voltage 50 V Time[ms] | Voltage 80 V Time[ms] | CP[° C.] |
|---|---|---|---|
| 101 | 92.6 | 131.5 | 123 |
| 102 | 92.3 | 131.0 | 121 |
| 103 | 92.0 | 130.6 | 120 |
| 104 | 91.0 | 130.0 | 119 |
| 105 | 88.2 | 128.8 | 117 |

EXAMPLE 12

In example 12, 10,000 PTC elements A were prepared, 5 PTC elements B and 5 PTC elements C were mixed with these PTC elements A, and the PTC elements A to C were sorted.

Figure 23:
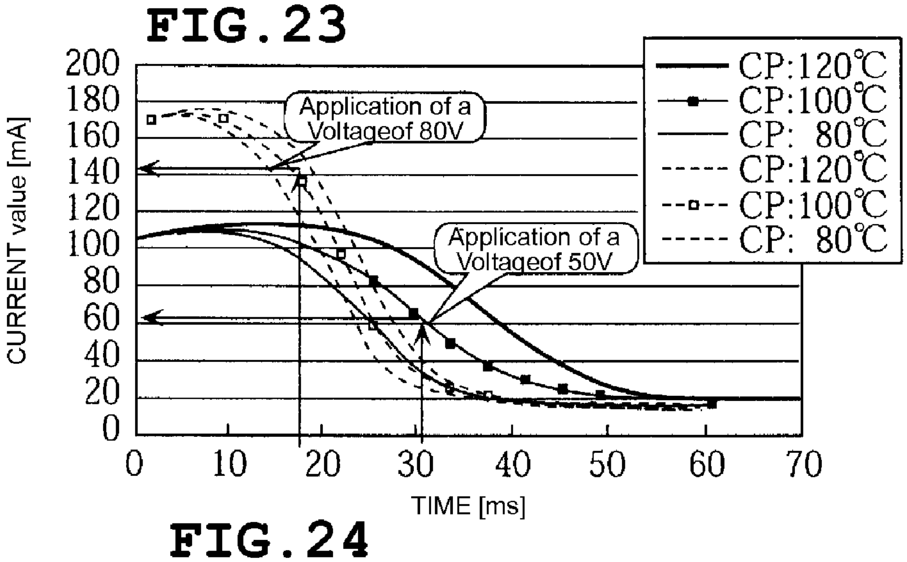
FIG. 23 is a characteristic diagram showing the relationship between the current value in the PTC elements and time.
Figure 24:
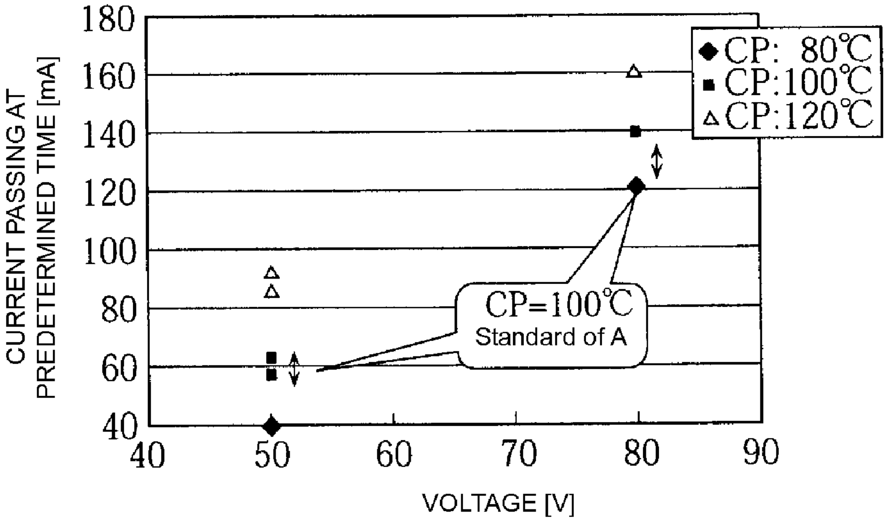
FIG. 24 illustrates the current value passing at predetermined times.

As illustrated in FIGS. 23 and 24, the PTC elements A to C were subjected to the application of a DC voltage of 50 V, the currents passing through the PTC elements A to C were measured when 30 ms elapsed. After the PTC elements A to C were cooled to room temperature, the PTC elements A to C were again subjected to the application of a DC voltage of 80V, and the currents passing through the PTC elements A to C were measured when 18 ms elapsed. Elements whose measured currents deviated from the range of about 58 mA to about 62 mA in the case of 50 V and elements whose measured currents deviated from the range of about 138 mA to about 140 mA in the case of 80 V were separated.

As a result, ten elements deviating from the current ranges were present. As can be seen from Table 12, the elements having sample Nos. 111 to 120 were either of the PTC elements B whose CP was 120±5° C. and the PTC elements C whose CP was 80±5° C. As described above, according to example 12, an advantageous effect similar to that in the above examples is obtained.

TABLE 12

| Sample No. | Voltage 50 V Time[ms] | Voltage 80 V Time[ms] | CP[° C.] |
|---|---|---|---|
| 111 | 92.6 | 159.7 | 123 |
| 112 | 92.3 | 159.3 | 121 |
| 113 | 92.0 | 159.0 | 120 |
| 114 | 91.0 | 158.7 | 119 |
| 115 | 88.2 | 158.4 | 117 |
| 116 | 40.0 | 122.0 | 85 |
| 117 | 39.4 | 121.8 | 83 |
| 118 | 39.0 | 121.0 | 80 |
| 119 | 38.6 | 120.8 | 78 |
| 120 | 38.0 | 120.0 | 75 |

Figure 25:
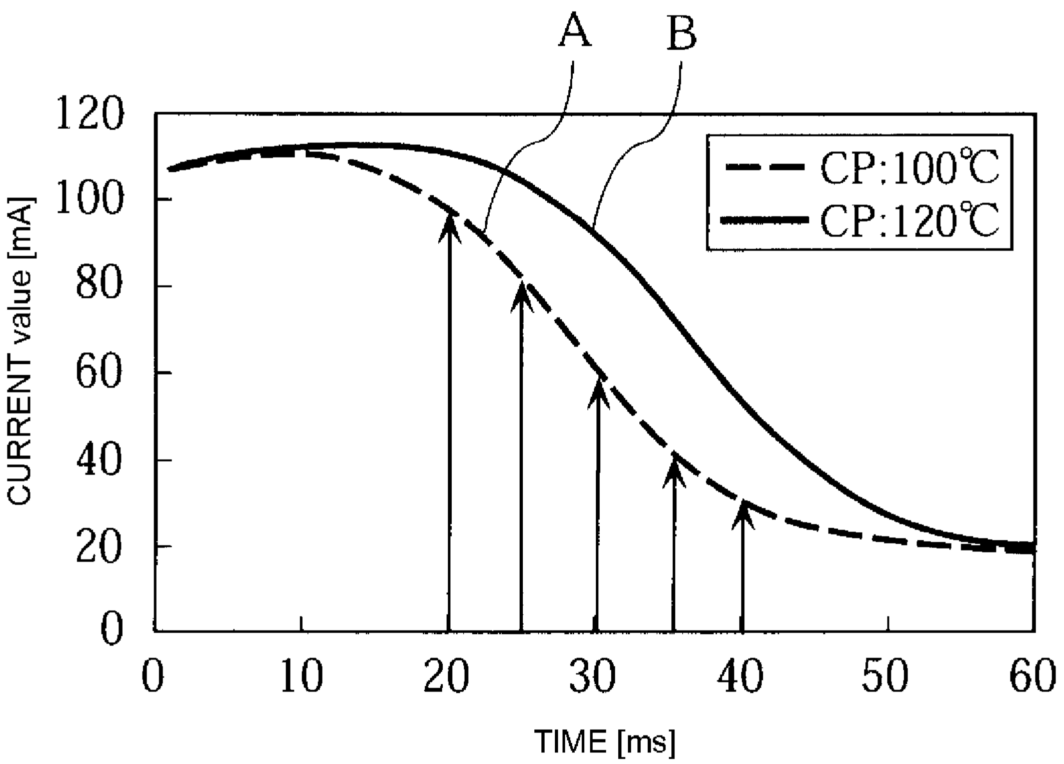
FIG. 25 is a characteristic diagram showing the relationship between the current value in the PTC elements and time.

FIG. 25 is a characteristic diagram showing the relationship between the current value in the PTC elements and time for explaining a sorting method according to a seventh preferred embodiment of the present invention.

In this preferred embodiment, the PTC elements A and B were subjected to the application of a DC voltage of 50 V, and the waveforms of currents passing through the PTC elements A and B during the application were measured with the oscilloscope. The current values passing through the PTC elements A and B were measured every 5 ms from when 20 ms elapsed to when 40 ms elapsed after the beginning of the application of the voltage. The measured current values were accumulated. As a consequence, the accumulated values for the PTC elements A ranged from about 280 mA to about 340 mA and those for the PTC elements B ranged from about 400 mA to about 460 mA.

EXAMPLE 13

In example 13, 10,000 PTC elements A were prepared, 5 PTC elements B were mixed with these PTC elements A, and the PTC elements A and B were sorted.

The PTC elements A and B were subjected to the application of a DC voltage of 50 V, the current values passing through the PTC elements A and B were measured every 5 ms in the period of time between 20 ms and 40 ms. The measured current values were accumulated, and elements having the accumulated values deviating from the range of about 280 mA to about 340 mA were separated.

As a result, five elements deviating from the range were present. As can be seen from Table 13, the elements having sample Nos. 121 to 125 were the PTC elements B whose CP was 120±5° C. According to example 13, the sorting of elements can be performed in as little as several tens of milliseconds per component, and an advantageous effect similar to that in the above examples is obtained.

TABLE 13

| Sample No. | Accumulated Value[mA] | CP[° C.] |
|---|---|---|
| 121 | 447.7 | 123 |
| 122 | 435.9 | 121 |
| 123 | 430.0 | 120 |
| 124 | 424.1 | 119 |
| 125 | 412.3 | 117 |

EXAMPLE 14

In example 14, 10,000 PTC elements A were prepared, 5 PTC elements B and 5 PTC elements C were mixed with these PTC elements A, and the PTC elements A to C were sorted.

The PTC elements A to C were subjected to the application of a DC voltage of 50 V, the current values passing through the PTC elements A to C were measured every 5 ms in the period of time between 20 ms and 40 ms after the application of the voltage started. The measured current values were accumulated, and elements having the accumulated values deviating from the range of about 280 mA to about 340 mA were separated.

As a result, ten elements deviating from the range for the accumulated value were present. As can be seen from Table 14, the elements having sample Nos. 131 to 140 were either of the PTC elements B whose CP was 120±5° C. and the PTC elements C whose CP was 80±5° C. According to example 14, an advantageous effect similar to that in the above examples is obtained.

TABLE 14

| Sample No. | Accumulated Value[mA] | CP[° C.] |
|---|---|---|
| 131 | 217.6 | 77 |
| 132 | 225.9 | 79 |
| 133 | 230.0 | 80 |
| 134 | 234.1 | 81 |
| 135 | 242.4 | 83 |
| 136 | 412.3 | 117 |
| 137 | 424.1 | 119 |
| 138 | 430.0 | 120 |
| 139 | 435.9 | 121 |
| 140 | 447.7 | 123 |

EXAMPLE 15

In example 15, 100 PTC elements A were prepared, and 5 PTC elements B were mixed with these PTC elements A. The PTC elements A and B were subjected to the application of a DC voltage of 50 V, and the waveforms of currents passing through the PTC elements A and B during the application were measured with the oscilloscope.

TABLE 15

| Sample No. | CP[° C.] | R25[Ω] | Accumulated Value[mA] 1~13 ms | 25~45 ms | 60~80 ms |
|---|---|---|---|---|---|
| 141 | 123 | 260 | 572 | 375 | 87 |
| 142 | 121 | 400 | 484 | 363 | 89 |
| 143 | 120 | 470 | 440 | 358 | 90 |
| 144 | 119 | 540 | 396 | 352 | 91 |
| 145 | 117 | 680 | 308 | 340 | 93 |
| CP = 100° C. Element Range | | | 215~650 | 210~270 | 80~90 |
| CP = 120° C. Element Range | | | 220~660 | 330~390 | 85~95 |
| Percentage to Inrush Current (Current values/Inrush Value × 100) | | | 80~100% | 20~80% | 0~20% |

As shown in Table 15, the current values were measured every 4 ms in the period between 1 ms and 13 ms after the application of the voltage began, and the measured current values were accumulated. The accumulated values for the PTC elements A ranged from about 215 mA to about 650 mA. However, all of the accumulated values for the PTC elements were within the range of about 215 mA to about 650 mA, such that the PTC elements could not be appropriately sorted. When the accumulated values for the PTC elements B in this section were checked, the accumulated values ranged from about 220 mA to about 660 mA. Therefore, the PCT elements could not be appropriately sorted using this range.

Next, the current values were measured every 5 ms in the period of time between 60 ms and 80 ms after the application of the voltage started, and the measured current values were accumulated. The accumulated values for the PTC elements A ranged from about 80 mA to about 90 mA. However, among the measured PTC elements, PTC elements whose accumulated values deviated from the range of about 80 mA to about 90 mA were only two PTC elements of sample Nos. 141 and 142, such that not all five mixed PTC elements B could be separated. When the accumulated values for the PTC elements B in this section were checked, the accumulated values ranged from about 85 mA to about 95 mA. Therefore, it turned out that this range was insufficient for the reliable sorting of PCT elements.

Next, the PTC elements A and B were subjected to the application of a DC voltage of 50 V, the current value were measured every 5 ms in the period of time between 25 ms and 45 ms after the application of the voltage started, and the measured current values were accumulated. Elements whose accumulated values deviated from the range of about 210 mA to about 270 mA were separated.

As a result, five elements of sample Nos. 141 to 145 which deviated from this range were present. All of the accumulated values of the elements of sample Nos. 141 to 145 were within the range of about 330 mA to about 460 mA.

When the resistance-temperature characteristics of the elements of sample Nos. 141 to 145 deviating from this range were checked, the elements were the PTC elements B. Therefore, if the sort section is changed in this manner, all of the mixed elements can be separated. In other words, for a region where the waveform of current value is at or above about 80% of the value of an inrush current, the appropriate sorting of elements might not be performed because R25 greatly affects it. On the other hand, for a region where the current value is at or below about 20% of the value of the inrush current, CP had little effect. Therefore, it is preferable that a section to accumulate the current values be the section in which the currents range from about 20% of the value of an inrush current to about 80% thereof.

Even in the region where the current value is at or above about 80% of the value of the inrush current, if variations in R25 in lots of samples and in CP are small, the sorting of elements can be appropriately performed. More specifically, when variations in R25 are about ±20% and variations in CP are about ±2° C., the sorting of elements can be appropriately performed in a range where the current value is at or above about 85% of the value of the inrush current. When variations in R25 are about ±5% and variations in CP are about ±0.5° C., the sorting of elements can be appropriately performed in a range where the current value is at or above about 90% of the inrush current value.

Even in a region where the current value is below about 20% of the value of the inrush current, if variations in R25 in lots and in CP are small, the sorting of elements can be appropriately performed. More specifically, when variations in R25 are about ±30% and variations in CP are about ±3° C., the sorting of elements can be appropriately performed in a range where the current value is equal to or greater than about 18% of the value of the inrush current and smaller than about 20% thereof. When variations in R25 are about ±10% and variations in CP are about ±1° C., the sorting of elements can be appropriately performed in a range where the current value is equal to or greater than about 15% of the value of the inrush current and smaller than about 20% thereof.

EXAMPLE 16

In example 16, 100 PTC elements A were prepared, and 5 PTC elements B and 5 PTC elements C were mixed with these PTC elements A. The PTC elements A to C were subjected to the application of a DC voltage of 50 V, and the waveforms of currents passing through the PTC elements A and C during the application were measured with the oscilloscope.

TABLE 16

| Sample No. | CP[° C.] | R25[Ω] | Accumulated Value[mA] 1~13 ms | 25~45 ms | 60~80 ms |
|---|---|---|---|---|---|
| 151 | 77 | 680 | 300 | 177 | 88 |
| 152 | 79 | 540 | 385 | 174 | 86 |
| 153 | 80 | 470 | 428 | 171 | 85 |
| 154 | 81 | 400 | 471 | 168 | 84 |
| 155 | 83 | 260 | 556 | 165 | 82 |
| 156 | 117 | 680 | 308 | 375 | 93 |
| 157 | 119 | 540 | 396 | 363 | 91 |
| 158 | 120 | 470 | 440 | 358 | 90 |
| 159 | 121 | 400 | 484 | 352 | 88 |
| 160 | 123 | 260 | 572 | 340 | 87 |
| CP = 80° C. Element Range | | | 210~640 | 155~185 | 80~90 |
| CP = 100° C. Element Range | | | 215~650 | 210~270 | 80~90 |
| CP = 120° C. Element Range | | | 220~660 | 330~390 | 85~95 |
| Percentage to Inrush Current (Current values/Inrush Value × 100) | | | 80~100% | 20~80% | 0~20% |

As shown in Table 16, the current values were measured every 4 ms in the period between 1 ms and 13 ms after the application of the voltage started, and the measured current values were accumulated. The accumulated values for the PTC elements A ranged from about 215 mA to about 650 mA. However, all of the accumulated values for the PTC elements were within the range of about 215 mA to about 650 mA, such that the PTC elements could not be appropriately sorted. When the accumulated values for the PTC elements B in this section were checked, the accumulated values ranged from about 220 mA to about 660 mA. Therefore, the PCT elements could not be appropriately sorted by using this range.

Next, the current values were measured every 5 ms in the period of time between 60 ms and 80 ms after the application of the voltage started, and the measured current values were accumulated. The accumulated values for the PTC elements A ranged from about 80 mA to about 90 mA. However, among the measured PTC elements, PTC elements whose accumulated values deviated from the range of about 80 mA to about 90 mA were only two PTC elements of sample Nos. 156 and 157, such that not all of mixed PTC elements B and C could be separated. When the accumulated values in this section were checked, the accumulated values for the PTC elements C ranged from about 80 mA to about 90 mA and those for the PTC elements B ranged from about 85 mA to about 95 mA. Therefore, this range was also insufficient for the reliable sorting of PCT elements.

Next, the PTC elements A to C were subjected to the application of a DC voltage of 50 V, the current values were measured every 5 ms in the period of time between 25 ms and 45 ms after the application of the voltage started, and the measured current values were accumulated. Elements whose accumulated values deviated from the range of about 210 mA to about 270 mA were separated.

As a result, ten elements of sample Nos. 151 to 160 which deviated from this range were present. The accumulated values of the elements of sample Nos. 151 to 160 were either of within the range of about 155 mA to about 185 mA and within the range of about 330 mA to about 390 mA. When the resistance-temperature characteristics of the elements of sample Nos. 151 to 160 which deviated from the ranges were checked, these elements were either of the PTC elements B and the PTC elements C. Therefore, in this example, it is also preferable that a section to accumulate the current values be the section in which the current values range from about 20% of the value of an inrush current to about 80% thereof.

Even in the region where the current value is at or above about 80% of the inrush current value, if variations in R25 in lots of samples and in CP are small, the sorting of elements can be appropriately performed. More specifically, when variations in R25 are about ±20% and variations in CP are about ±2° C., the sorting of elements can be appropriately performed in a range where the current value is at or above about 85% of the value of the inrush current. When variations in R25 are about ±5% and variations in CP are about ±0.5° C., the sorting of elements can be appropriately performed in a range where the current value is at or above about 90% of the value of the inrush current.

Even in a region where the current value is below about 20% of the value of the inrush current, if variations in R25 in lots and in CP are small, the sorting of elements can be appropriately performed. More specifically, when variations in R25 are about ±30% and variations in CP are about ±3° C., the sorting of elements can be appropriately performed in a range where the current value is equal to or greater than about 18% of the value of the inrush current and smaller than about 20% thereof. When variations in R25 are about ±10% and variations in CP are about ±1° C., the sorting of elements can be appropriately performed in a range where the current value is equal to or greater than about 15% of the value of the inrush current and smaller than about 20% thereof.

In the examples described above, the PTC elements are sorted by using the dynamic characteristics thereof. However, in the present invention, in addition to this method, a sorting method that uses the static characteristics, Curie temperature, resistance-temperature characteristics, and/or other characteristics of the PTC elements may be combined.

Examples of a sorting method according to the static characteristics include (1) applying a predetermined voltage to PTC elements and sorting characteristics on the basis of the difference between the current values in the PTC elements when a state of thermal equilibrium is substantially reached; (2) passing a predetermined current through the PTC elements and sorting characteristics on the basis of the difference between the voltage values in the PTC elements when a state of thermal equilibrium is substantially reached; (3) applying different voltages to the PTC elements and sorting characteristics on the basis of the differences between the respective current values in PTC elements when a state of thermal equilibrium is substantially reached; and (4) passing different currents through the PTC elements and sorting characteristics on the basis of the differences between the respective current values in PTC elements when a state of thermal equilibrium is substantially reached.

Examples of a sorting method according to Curie temperature and/or resistance-temperature characteristics include (1) applying a voltage to PTC elements, increasing the resistance value by using self-heating of the PTC elements, measuring the resistance value and temperature of the PTC elements when the resistance value reaches a predetermined resistance value, and sorting characteristics on the basis of the difference between the values of Curie temperature of the PTC elements; and (2) changing a voltage applied to PTC elements, increasing the resistance value by using self-heating of the PTC elements, measuring the temperature after a lapse of a predetermined period of time, and sorting characteristics on the basis of the difference between the values of Curie temperature of the PTC elements.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for sorting PTC elements having different resistance-temperature characteristics, the method comprising the steps of:

applying to each of the PTC elements a predetermined voltage that allows a current to sufficiently decay; and sorting the PTC elements on the basis of a difference between the times required for the currents passing through the PTC elements to reach a predetermined current value.

2. A method for sorting PTC elements having different resistance-temperature characteristics, the method comprising:

applying to each of the PTC elements a predetermined voltage that allows a current to sufficiently decay; and sorting the PTC elements on the basis of a difference between the current values passing through the PTC elements when a predetermined time has elapsed.

3. A method for sorting PTC elements having different resistance-temperature characteristics, the method comprising:

applying to each of the PTC elements a predetermined voltage that allows a current to sufficiently decay; and sorting the PTC elements on the basis of differences between the times required for the currents passing through the PTC elements to reach a plurality of predetermined current values.

4. A method for sorting PTC elements having different resistance-temperature characteristics, the method comprising:

applying to each of the PTC elements a predetermined voltage that allows a current to sufficiently decay; and sorting the PTC elements on the basis of differences between the current values passing through the PTC elements when a plurality of predetermined times have elapse.

5. A method for sorting PTC elements having different resistance-temperature characteristics, the method comprising:

applying to each of the PTC elements a plurality of predetermined voltages that allow a current to sufficiently decay; and sorting the PTC elements on the basis of differences between the times required for the currents passing through the PTC elements to reach a predetermined current value.

6. A method for sorting PTC elements having different resistance-temperature characteristics, the method comprising:

applying to each of the PTC elements a plurality of predetermined voltages that allow a current to sufficiently decay; and sorting the PTC elements on the basis of differences between the current values passing through the PTC elements when a predetermined time has elapses.

7. The method for sorting PTC elements according to claim 4, wherein at least two current values are measured in each of the PTC elements, the measured currents are accumulated to determine an accumulated value, and the PTC elements are sorted on the basis of the difference between the accumulated values.

8. The method for sorting PTC elements according to claim 7, wherein a section to accumulate the current value is a section in which the currents range from about 20% of the value of an inrush current to about 80% thereof.

* * * * *

UNITED STATES PATENT AND TRADEMARK OFFICE

CERTIFICATE OF CORRECTION

PATENT NO. : 7,605,352 B2
APPLICATION NO. : 11/466775
DATED : October 20, 2009
INVENTOR(S) : Nagao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Fifth Day of October, 2010

David J. Kappos

*Director of the United States Patent and Trademark Office*